(12) United States Patent
Schwarz

(10) Patent No.: US 10,845,464 B2
(45) Date of Patent: Nov. 24, 2020

(54) LIDAR SENSOR INCLUDING AN OPTICAL FILTER

(71) Applicant: Robert Bosch GmbH, Stuttgart (DE)

(72) Inventor: Hans-Jochen Schwarz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 539 days.

(21) Appl. No.: 15/261,325

(22) Filed: Sep. 9, 2016

(65) Prior Publication Data

US 2017/0082733 A1 Mar. 23, 2017

(30) Foreign Application Priority Data

Sep. 18, 2015 (DE) .................. 10 2015 217 910

(51) Int. Cl.
| | |
|---|---|
| *G01S 7/48* | (2006.01) |
| *G01S 7/481* | (2006.01) |
| *G02B 5/20* | (2006.01) |
| *G02B 5/26* | (2006.01) |
| *G02B 27/14* | (2006.01) |
| *G01S 17/931* | (2020.01) |
| *G01S 7/483* | (2006.01) |
| *G02B 5/28* | (2006.01) |
| *G01S 17/42* | (2006.01) |

(52) U.S. Cl.
CPC ............ *G01S 7/4811* (2013.01); *G01S 7/483* (2013.01); *G01S 7/4816* (2013.01); *G01S 17/931* (2020.01); *G02B 5/203* (2013.01); *G02B 5/26* (2013.01); *G02B 5/285* (2013.01); *G02B 27/141* (2013.01); *G02B 27/144* (2013.01); *G01S 17/42* (2013.01)

(58) Field of Classification Search
CPC .................................. G01C 3/08; G01S 17/00
See application file for complete search history.

(56) References Cited

U.S. PATENT DOCUMENTS

| | | | |
|---|---|---|---|
| 6,433,860 B1* | 8/2002 | Ohishi ..................... | G01S 7/483 356/5.01 |
| 2007/0076208 A1* | 4/2007 | Koo ......................... | G01J 3/453 356/451 |
| 2007/0188735 A1* | 8/2007 | Braunecker ........... | G01S 7/4812 356/4.09 |
| 2008/0285008 A1* | 11/2008 | Vachss ..................... | G01J 3/42 356/5.01 |
| 2010/0182671 A1* | 7/2010 | Park ........................ | G02F 1/0311 359/245 |
| 2017/0212219 A1* | 7/2017 | Spuler ................... | G01S 7/4812 |

* cited by examiner

*Primary Examiner* — Luke D Ratcliffe
(74) *Attorney, Agent, or Firm* — Norton Rose Fulbright US LLP; Gerard Messina

(57) ABSTRACT

A LIDAR sensor including an optical receiver and an optical filter situated in the beam path upstream from the receiver. The filter is formed by connecting a transmission filter and a reflection filter in series.

7 Claims, 3 Drawing Sheets

LIDAR SENSOR INCLUDING AN OPTICAL FILTER

CROSS REFERENCE

The present application claims the benefit under 35 U.S.C. § 119 of German Patent Application No. DE 102015217910.9 filed on Sep. 18, 2015, which is expressly incorporated herein by reference in its entirety.

FIELD

The present invention relates to a LIDAR sensor including an optical receiver and an optical filter situated in the beam path upstream from the receiver.

BACKGROUND INFORMATION

LIDAR sensors are used, for example, in driver assistance systems for motor vehicles for detecting the traffic environment. A beam source, typically a semiconductor laser, generates a bundled laser beam having a sharply defined useful wavelength $\lambda 0$, which, for example, is deflected with the aid of an oscillating micro-mirror in such a way that it scans a certain angle range, or in the case of a two-dimensional deflection, a solid angle range. The scanned angle range or solid angle range is denoted as the locating range. If the laser beam strikes an object in the locating range, for example, a preceding vehicle, a portion of the light is reflected and received in the receiver of the LIDAR sensor. The intensity of the laser beam is modulated, for example, pulsed, making it possible to measure the propagation time of the optical signal from the beam source to the object and back to the receiver in the LIDAR sensor. From this propagation time, it is then possible to calculate the distance of the object based on the known speed of light.

The components of the LIDAR sensor are normally encapsulated in a housing, which has an entrance window, through which the reflected light strikes the receiver. In most cases, a transmission filter is situated on or in the entrance window, which, preferably, should only be transparent for useful wavelength $\lambda 0$, and is used for filtering out background light having different wavelengths, so that the measuring results are not falsified by the background light, and in the case of a strong incidence of background light, for example, an incidence of sunlight, the housing of the LIDAR sensor does not become so severely overheated that the function of the optical and electronic components is impaired.

A narrow-band transmission filter is constructed from a plurality of optical layers. A transmission filter having high optical quality is therefore relatively expensive. Moreover, a more or less large portion of the light at useful wavelength $\lambda 0$ is absorbed in the various layers of the filter, thus limiting the sensitivity of the LIDAR sensor, this limitation being intensified by increasing the narrow-bandedness of the filter.

SUMMARY

An object of the present invention is to provide a LIDAR sensor including a narrow-band optical filter and simultaneously high sensitivity at the useful wavelength.

This object is achieved according to the present invention in that the filter is formed by connecting a transmission filter and a reflection filter in series.

Narrow-band reflection filters, i.e., filters that have a high reflectivity only at a special wavelength, may be manufactured relatively simply and cost-effectively. According to the present invention, the reflection filter is situated in the beam path in such a way that the incident light having useful wavelength $\lambda 0$ is deflected to the receiver, while light having other wavelengths is allowed to pass through by the reflection filter and consequently does not reach the receiver. The transmission filter filters out light at wavelengths that differ more greatly from the useful wavelength. The transmission filter may be designed in such a way that it is sufficiently broadband to have a transmissivity of nearly 100% at useful wavelength $\lambda 0$, so that the sensitivity of the LIDAR sensor is not impaired. The combined effect of the broadband transmission filter and the narrow-band reflection filter causes the light that is neither filtered out by the transmission filter nor deflected by the reflection filter to the receiver and consequently reaches the interior of the housing possibly resulting in heating, is essentially only made of wavelength components closely above and closely below the useful wavelength, and consequently the energy content of this radiation component is very small.

Advantageous embodiments and refinements of the present invention are described herein.

In one advantageous specific embodiment, the transmission filter is situated in light incidence direction upstream from the reflection filter, so that the light having useful wavelength $\lambda 0$ first passes through the transmission filter and is subsequently deflected by the reflection filter. The transmission filter may be situated close to or in the entrance window of the housing, so that the filtered out light components do not enter the interior of the housing.

The reflection filter may advantageously be formed by a Bragg reflector, which is constructed from multiple thin layers having different optical densities and in which the thicknesses of the individual layers are selected in such a way that selectively only the light of a very particular wavelength, namely of useful wavelength $\lambda 0$, is reflected.

In a particularly advantageous specific embodiment, the reflection filter simultaneously forms a beam splitter, which allows a part of the light generated by the beam source to pass through, so that this light may be emitted into the locating range, and which deflects to the receiver a portion of the light reflected in the locating range and impinging again on the reflection filter. This has the advantage that the housing needs to have only a single window for the exit of the emitted beam and the entry of the reflected light. If the transmission filter is situated on or in this single window, the incidence of ambient light into the housing may be suppressed with the aid of a single transmission filter.

Normally, a semitransparent mirror, which forms the reflection filter here, has a certain reflectivity (for example, 50%) and a certain transmissivity (for example, 50%), regardless from which side the light impinges on the mirror. However, mirrors in which the reflectivity and transmissivity are different for the diametrically opposed sides of the mirror are also conceivable as reflection filters. In this case, the transmissivity in the case of light incidence from the side of the beam source should preferably be high (at least 50%), and in the case of light incidence from the side diametrically opposite, the reflectivity should preferably be high (at least 50%).

Exemplary embodiments of the present invention are explained in greater detail below with reference to the figures.

DETAILED DESCRIPTION OF EXAMPLE EMBODIMENTS

Figure 1:
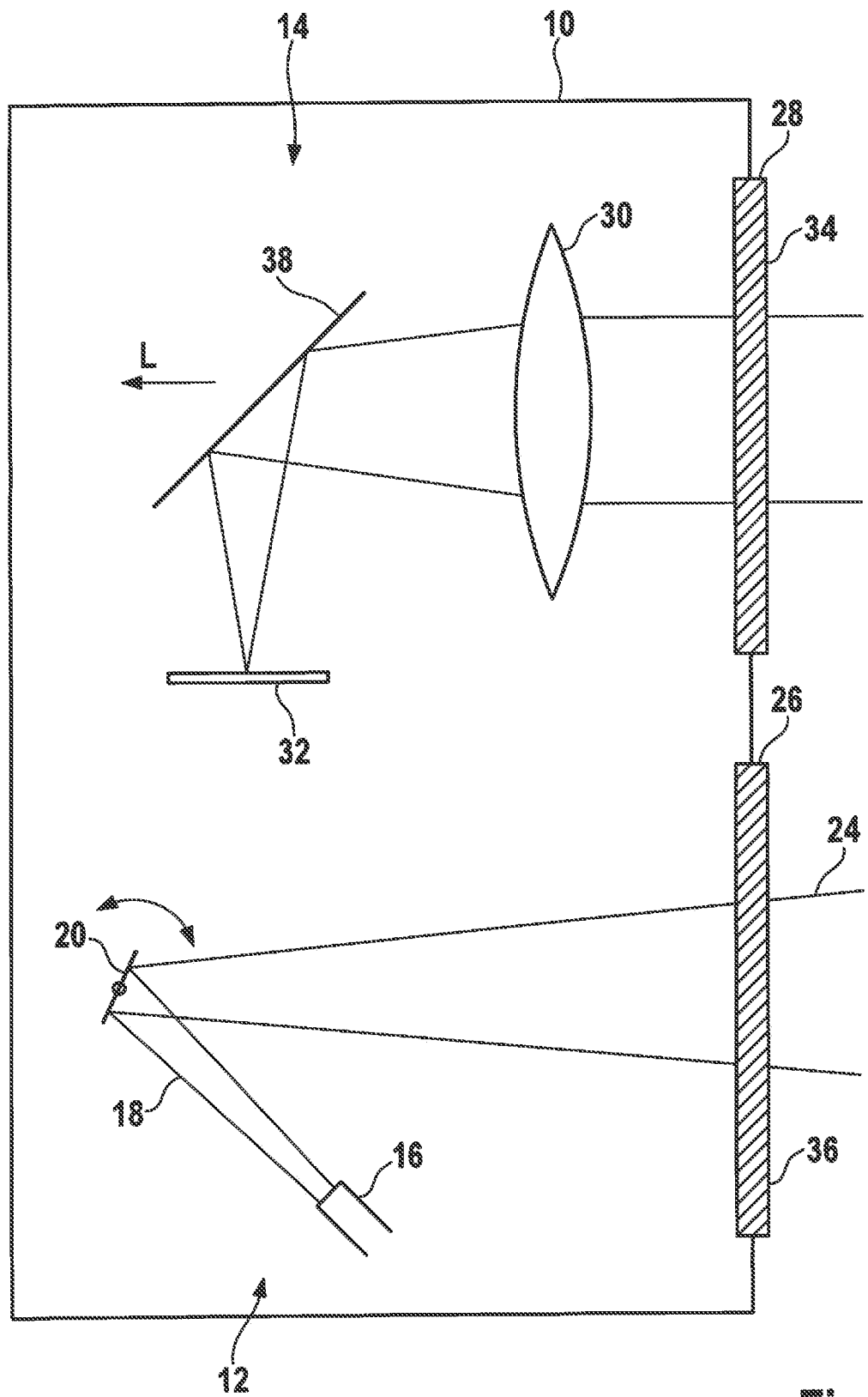
FIG. 1 shows a schematic diagram of a LIDAR sensor according to a first exemplary embodiment of the present invention.

The LIDAR sensor shown in FIG. 1 has a housing 10, which accommodates a sending part 12 (below in FIG. 1), and a receiving part 14 (above) formed separately from the sending part.

Sending part 12 has a beam source 16, which is, for example, formed by a semiconductor laser, and emits a bundled beam 18 of laser light having a sharply defined useful wavelength λ0 onto a deflection mirror 20 which deviates in an oscillating manner. The light deflected on deflection mirror 20 exits housing 10 through an exit window 26 as scanning beam 24. Deflection mirror 20 deviates scanning beam 24 periodically in such a way that it scans a certain locating range.

The light reflected from objects in the locating range re-enters housing 10 through entrance window 28 and is focused by a lens 30 onto an optoelectronic receiver 32, which is formed, for example, by a CCD field. Based on the incidence location of the light on receiver 32, it is possible to determine the locating angle of the located object, and based on the time difference between the emission of a light pulse by beam source 16 and the reception of this light pulse by receiver 32, it is possible to determine the distance of the object.

In the example shown here, a transmission filter 34 is situated in entrance window 28, which is only transparent for light in a certain wavelength range around useful wavelength λ0. This transmission filter 34 filters out a large portion of the background light from the radiation arriving at receiver 32. In particular, this also applies to sunlight, which is thus prevented from entering housing 10 and causing the electronic components of the LIDAR sensor to be heated.

For the same reason, a transmission filter 36 is situated in exit window 26 in the shown example, the transmission filter essentially only allowing light having useful wavelength λ0, i.e., scanning beam 24 to pass through.

A reflection filter 38 is situated in the beam direction between transmission filter 34 and receiver 32, in the shown example between imaging lens 30 and receiver 32, for example, a Bragg reflector which deflects the incident light having useful wavelength λ0 by 90° onto receiver 32. Reflection filter 38 has an essentially narrower bandwidth than transmission filter 34. Light fractions, whose wavelength is somewhat different from useful wavelength λ0, but not so different that they would already be filtered out by transmission filter 34, are allowed to pass through as residual light L by reflection filter 38 and, for example, absorbed by the walls of housing 10.

Figure 2:
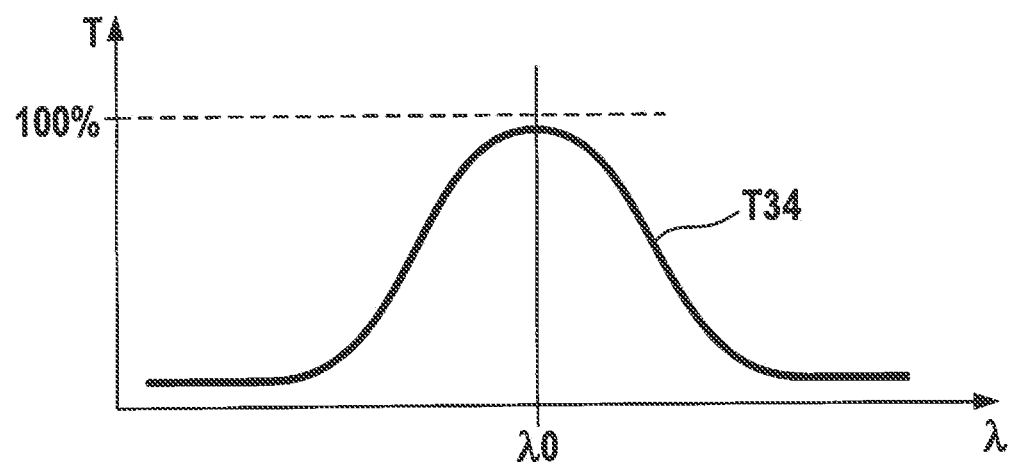
FIG. 2 shows intensities of the light allowed to pass through or reflected by different components of an optical filter as a function of wavelength A.
Figure 2:
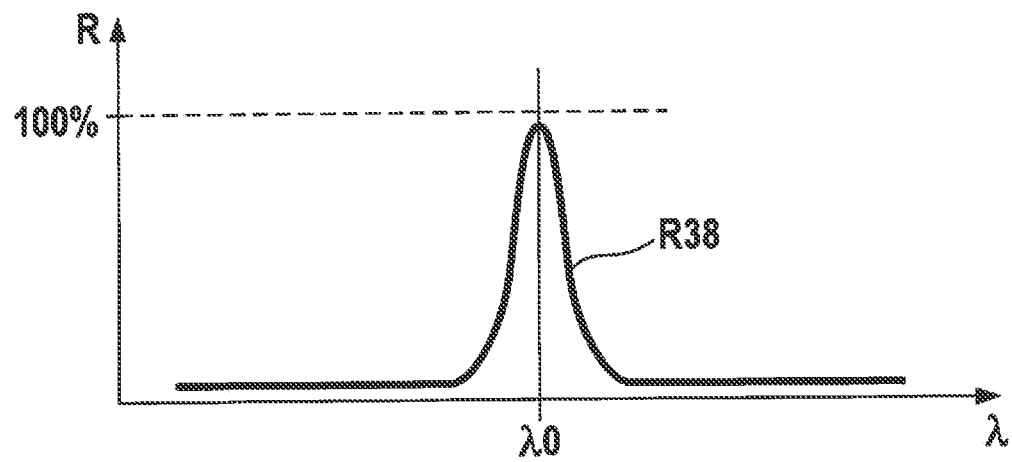
Figure 2:
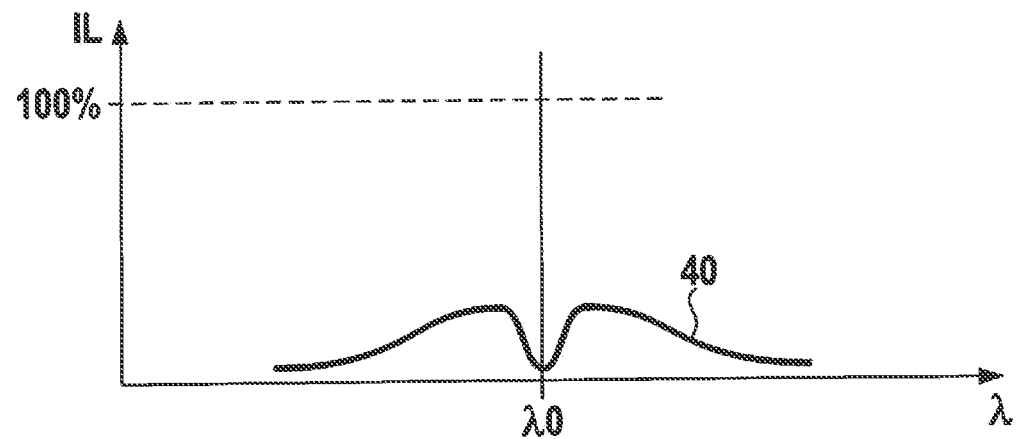

In FIG. 2, curve T34 shows transmissivity T of transmission filter 34 as a function of wavelength A. The curve has a maximum at useful wavelength λ0. There, the transmissivity amounts to nearly 100%, so that the light of the laser beam is allowed to pass through practically undiminished. At larger and smaller wavelengths, the curve drops off, so that the transmissivity is nearly zero at wavelengths that differ significantly from λ0.

Curve R38 in FIG. 2 shows reflectivity R of reflection filter 38. This curve also has a maximum at λ0 and reaches a value of nearly 100% there, so that the laser radiation is nearly completely reflected onto receiver 32. The peak of reflectivity R at λ0 is, however, significantly narrower than the corresponding peak of curve T34, i.e., reflection filter 38 has a narrower bandwidth than transmission filter 34.

Lower curve 40 in FIG. 3 shows, again as a function of wavelength λ, intensity IL of residual light L, which has passed through the transmission filter (IL=T*(1−R)). At λ0, this curve has a local minimum, since the light having this wavelength is reflected on reflection filter 38, and at both sides of wavelength λ0 has two weakly defined maxima corresponding to the radiation which was allowed to pass through by both transmission filter 34 and by reflection filter 38. This curve shows that the energy content of the radiation, which ultimately enters housing 10 as heat, is reduced significantly by the filter system according to the present invention, while on the other hand the light having useful wavelength λ0 reaches receiver 32 practically unattenuated.

Figure 3:
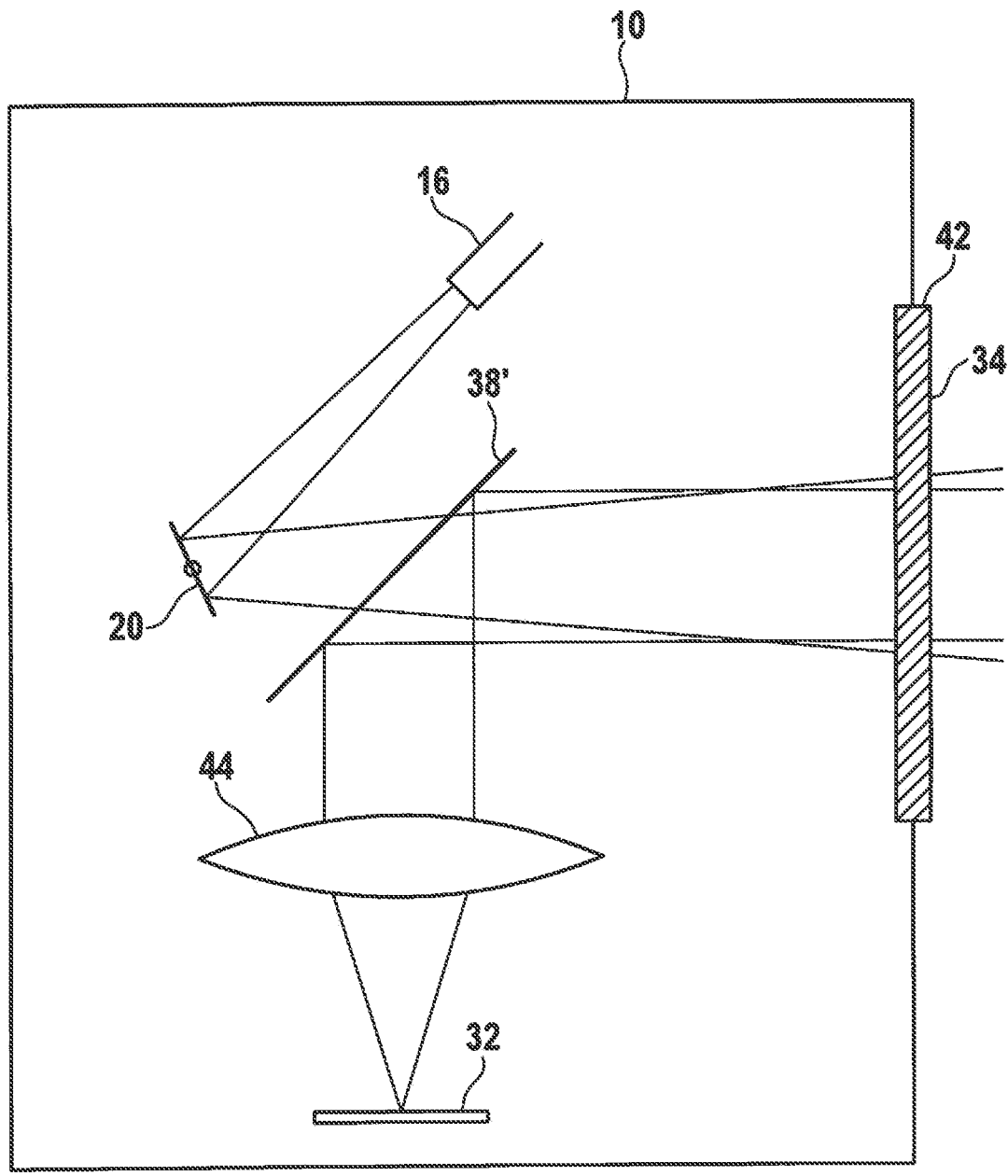
FIG. 3 shows a schematic diagram of a LIDAR sensor according to another exemplary embodiment.

FIG. 3 shows another exemplary embodiment, in which housing 10 has only one entrance and exit window 42, which is filled by transmission filter 34.

A reflection filter 38' simultaneously forms here a beam splitter having a transmissivity of 50% and a reflectivity of 50% (both regardless on which side of the mirror the light impinges). Of the light generated by beam source 16 and deflected on deflection mirror 20, a portion of 50% is consequently allowed to pass through reflection filter 38', so that it is emitted through transmission filter 34. Here also, transmission filter 34 has a transmissivity of nearly 100% for the light of the laser radiation having wavelength λ0, so that the intensity of the scanning beam is practically not degraded. Similarly, transmission filter 34 little degrades the intensity of the light reflected on the objects which again impinges on reflection filter 38'. Since at wavelength λ0, this reflection filter has a reflectivity of 50%, the incident beam is split into two beams of equal intensity, one of which again impinges on deflection mirror 20 and the other is decoupled in the direction of receiver 32. In this case also, the residual light, which passes through reflection filter 38' in the direction of deflection mirror 20, is largely suppressed by the combined effect of transmission filter 34 and reflection filter 38'.

In the shown example, an imaging lens 44, which focuses the light onto the receiver, is situated between reflection filter 38' and receiver 32.

What is claimed is:

1. A LIDAR sensor including an optical receiver and an optical filter situated in a beam path upstream from the receiver, wherein the filter is formed by connecting a transmission filter and a reflection filter in series, wherein:
   the reflection filter deflects to the receiver light centered on a useful wavelength,
   the reflection filter allows to be transmitted therethrough a first wavelength band having a highest wavelength that is lower than the useful wavelength and a second wavelength band having a lowest wavelength that is higher than the useful wavelength, and
   a band between the highest wavelength of the first wavelength band and the lowest wavelength of the second wavelength band is smaller than each of the first wavelength band and the second wavelength band, wherein each of the first wavelength band and the second wavelength band represents an intensity that is a function of a transmissivity of the transmission filter and a reflectivity of the reflection filter.

2. The LIDAR sensor as recited in claim 1, wherein the transmission filter is situated in a propagation direction of received light upstream from the reflection filter.

3. The LIDAR sensor as recited in claim 1, wherein the reflection filter is a Bragg reflector.

4. The LIDAR sensor as recited in claim 1, wherein the reflection filter is a beam splitter, which allows a portion of a light beam having a useful wavelength generated by a beam source to pass in transmission and exit into surroundings and decouples in reflection a portion of light received from the surroundings having the useful wavelength and guides it to the receiver.

5. The LIDAR sensor as recited in claim 4, wherein the reflection filter at the useful wavelength has a transmissivity of at least 50% for light which is incident from a side of the beam source, and a reflectivity of at least 50% for light incident from a diametrically opposed side.

6. The LIDAR sensor as recited in claim 1, wherein a bandwidth of the reflection filter is narrower than a bandwidth of the transmission filter.

7. The LIDAR sensor as recited in claim 1, further comprising:
    a lens disposed between the transmission filter and the reflection filter.

\* \* \* \* \*